Aug. 7, 1951 A. G. KANDOIAN 2,562,921

HIGH POWER ULTRA HIGH FREQUENCY LOAD DEVICE

Filed March 10, 1945

INVENTOR.
ARMIG G. KANDOIAN
BY
Percy P. Lantzy
ATTORNEY

Patented Aug. 7, 1951 2,562,921

UNITED STATES PATENT OFFICE 2,562,921

HIGH POWER ULTRA HIGH FREQUENCY LOAD DEVICE

Armig G. Kandoian, New York, N. Y., assignor to Federal Telephone and Radio Corporation, New York, N. Y., a corporation of Delaware Application March 10, 1945, Serial No. 582,153

1 Claim. (Cl. 178—44)

This invention relates to ultra high frequency systems and more especially to power dissipating or load devices for such systems.

A principal object of the invention is to provide an improved tunable load device for high frequency systems to enable the device to dissipate large amounts of power at high frequencies.

Another object is to provide a load device employing a resonant cavity which can be used as a terminating or dummy impedance for ultra high-frequency transmission lines.

Heretofore, in ultra high frequency systems such as those used for frequency modulation and television transmissions and the like, it has been quite common to connect to the transmission line, at a predetermined point or points, power dissipating loads or impedances. These dummy loads usually have taken the form of ceramic coated insulators. Such prior devices have been subject to a number of disadvantages, not the least of which is the liability to burn out, and the liability of the ceramic insulation to crack. Accordingly, it is another principal object of this invention to provide a dummy load device for ultra high-frequency use, wherein the above-noted and other disadvantages of the usual dummy impedance or resistance, are avoided.

A feature of the invention relates to an improved dummy load or power dissipating device for high frequency transmission lines, which device is of rugged construction and can provide simpler and better impedance matching control to the transmission line over a relatively wide frequency range, especially at ultra high-frequencies.

Another feature relates to a power dissipating device suitable for ultra high-frequency systems employing highly resonant transmission lines, wherein a tunable resonant cavity is provided and is so designed as to enable it to act as a substantially pure load resistance at ultra high-frequencies.

A further feature relates to a terminating impedance for highly resonant transmission lines such as coaxial lines, and wherein the impedance can be easily adjusted to match the associated transmission lines over a relatively wide frequency range.

Another feature relates to a specially designed low Q resonant cavity power dissipating unit.

A still further feature relates to the novel organization, arrangement and relative location and interconnection of parts which constitute a simple, rugged and easily adjustable resonant cavity load device for high frequency transmission lines and the like.

Other features and advantages not particularly set forth will be apparent after a consideration of the following detailed description and the appended claim.

In the drawing, which illustrates certain typical embodiments,

In general, the invention contemplates a tunable ultra-frequency resonant cavity which is connected to a highly resonant transmission unit effective at ultra high-frequencies. The cavity is so designed and adjusted that radio frequency power from the line is transmitted into the cavity and is dissipated within the cavity in the form of heat. This is accomplished primarily by tuning the cavity to resonance and coupling the line to a part thereof having an impedance characteristic substantially equal to the surge impedance of the transmission line. In accordance with one aspect of the invention, the coupling is designed and adjusted so that the input impedance of the resonant cavity looking from the transmission line toward the cavity, is substantially a pure resistance and equal to the surge impedance of the transmission line. Under this condition, radio frequency power can be fed into the cavity from the line and this power is dissipated in the cavity losses. However, two limitations are existent in the amount of power that can be so dissipated namely the heat dissipation limitation of the cavity itself and the voltage maximum, before breakdown, within the cavity. The device according to the invention provides an efficient and rugged arrangement for meeting both these limitations.

Figure 1:
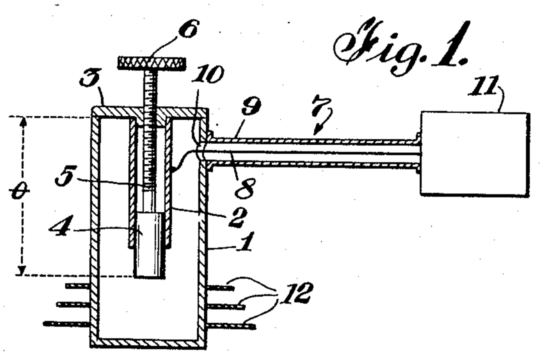
Fig. 1 shows one form of device according to the invention with direct coupling between the transmission line and the resonant cavity.

Referring to Fig. 1, there is shown a coaxial cavity device comprising an outer casing 1 of iron, brass or other suitable metal, and an inner coaxially supported thin-walled metal tube 2. In accordance with one feature of the invention, member 2 is of a metal or alloy which has a high loss factor at high frequencies, examples of such metals are iron, nickel, "Kovar," "Nichrome," etc. This has the effect of providing a resonant cavity of low "Q." It will be understood however, that the invention is not necessarily limited to such low Q cavities. The member 2 is attached, as by brazing or welding, to a metal cover 3 which closes off the member 1.

Members 1 and 2 therefore form a coaxial resonant cavity of which member 2 is the central conductor and member 1 is the surrounding or enclosing conductor. In order to adjust for resonance the member 2 is provided with a plunger 4 which is attached to a shank 5 having an adjusted knob 6 on its exterior end. Shank 5 is threaded and engages the corresponding threaded opening in the cover 3. Thus, by turning knob 6, the effective length of member 2 can be adjusted. The high frequency transmission line 7 may be of highly resonant coaxial type, the center conductor 8 being directly connected to member 2, while the outer pipe or sheath 9 is brazed or threaded to the casing 1 at the opening 10. Line 7 is shown schematically connected to a source 11 of high frequency power of any well-known kind. Since the tunable dissipating cavity formed by members 1, 2 and 4 is closed, its normal heat radiating properties are comparatively high and will therefore dissipate a considerable amount of heat. This heat is generated primarily in the member 2 which, in accordance with the invention, is purposely made of thin gauge metal stock. If desired, suitable head radiating fins 12 or the like can be attached to the outer surface of member 1, and additionally a fan or blower may be used to cool member 1. Furthermore water cooling may be used on member 2 to carry off the heat generated in this member.

The relationship between the maximum voltage developed in the cavity and the amount of power which the cavity is capable of dissipating is given by $$V=\sqrt{WQZ_0} \quad (1)$$

where W is the total power

Q is the "quality" factor of the cavity $Z_0$ is the surge impedance of the coaxial type cavity.

It is evident that the voltage V for a given amount of power W may be reduced by reducing the $Z_0$ or Q of the circuit. The latter is by far preferable because it also makes the circuit less critical to adjust—and less critical with frequency. The Q may, of course, be reduced by employing high loss materials, such as iron, nickel, "Kovar," "Nichrome," etc. as above noted.

Another very effective way of reducing the danger of voltage breakdown is to use oil dielectric within the cavity. This will increase the value of voltage at which breakdown will occur by a large factor—e. g. 5 to 10 or more. The presence of the oil will help the problem in two other ways also, first by increasing the losses in the circuit (by reducing the Q) and second by reducing the size of the cavity because of the increased dielectric constant compared to air.

In a cavity such as shown in Fig. 1, the impedance at any point $\theta$ along the center conductor 2 is a pure resistance given approximately by $$Z_\theta=Z_0Q\sin^2\theta \quad (2)$$

If for example the line 7 is a 50 ohm line, and the cavity dissipating unit is to be matched thereto, the value $\theta_{50}$ corresponding to the angular length $\theta$ to give 50 ohms pure resistance may be solved as follows:

$$Z_0=50=Z_0Q\sin^2\theta_{50} \quad (3)$$

$$\sin^2\theta_{50}=\frac{50}{Z_0Q} \quad (4)$$

$Z_0$ and Q may be determined by routine measurement and by the dimension of the center and outer conductor.

By this means, the point of coupling between the transmission line and the center conductor 2 for proper impedance matching can easily be determined. The connection may be direct or a loose coupling made depending upon the single impedance of the line and the structures of this resonant cavity device.

From the above relationship one can determine how much mismatch to expect as the frequency deviates but always keeping the cavity at resonance by a simple tuning arrangement such as that shown in Fig. 1. It can be seen that the frequency may be varied ±40% before the mismatch will exceed 2:1 on the feeding transmission line 7. If better match is required over that or larger frequency range one more control in addition to the tuning control is desirable. A simple diode, crystal or neon indicator may be used to determine the resonant point for any frequency in the well-known manner.

In practice two cavities of the above type have been built, one with a very high Q of 2500 and the second with a Q of only 60. Lower Q's than 60 are also obtainable. In both of the above cases the match on the feeding transmission line was good over the desired range of 500 to 600 megacycles.

Figure 2:
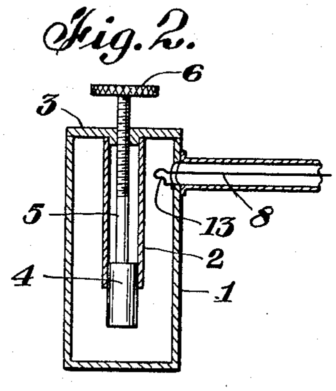
Figs. 2 and 3 are alternative forms of Fig. 1 showing respectively inductive coupling and capacity coupling between the transmission line and the resonant cavity.

Referring to Fig. 2, there is shown a device similar to Fig. 1 with the exception that the coaxial line conductor 8, instead of being directly coupled to the cavity is inductively coupled by means of the small inductive loop 13.

Figure 3:
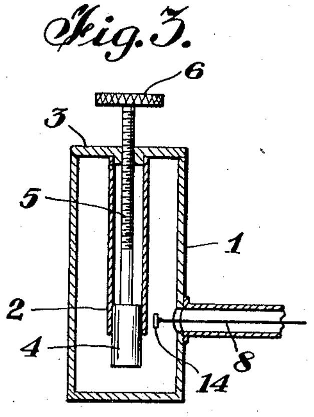

Fig. 3 shows another embodiment wherein the coaxial line conductor 8 is coupled to the cavity electrostatically by means of the small condenser plate 14 which is in spaced relation to the member 2.

Figure 4:
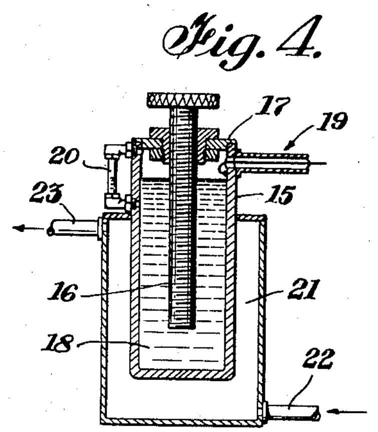
Figs. 4 and 5 represent further embodiments of the invention.

Referring to Fig. 4, there is shown another embodiment wherein the coaxial cavity comprises a metal container 15 and a thin-walled coaxially mounted tube 16, which is adjustably threaded through the cover 17, so as to vary the length of the member 16 within the member 15. The container 15 is provided with a filling of oil 18, the level of which is below the opening to which the coaxial line 19 is connected. The container 15 may be provided with an oil level indicating 20, and is arranged to be cooled by immersion within a water bath 21 which is supplied with running water through the inlet and outlet pipes 22, 23.

The oil within the cavity reduces the danger of voltage breakdown by a factor of at least 5 to 10 and also increases the loss characteristic of the cavity by reducing the Q thereof. It will be understood, of course, that oil may be used in the embodiments of Figs. 1, 2 and 3, in which event the size of the cavity may be reduced for the same amount of loss introduction, because of the increased dielectric constant of oil as compared with air.

Figure 5:
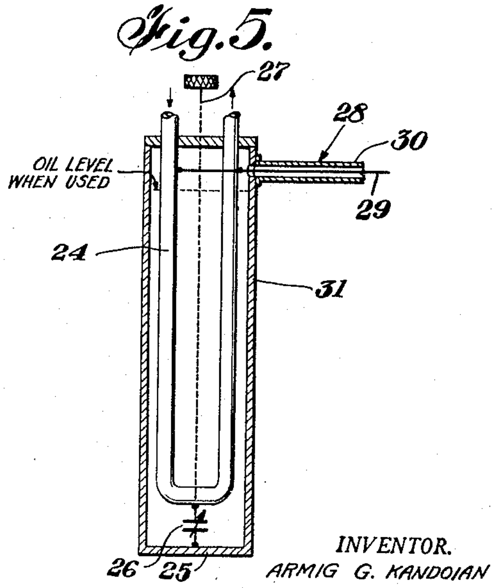

Referring to Fig. 5, there is shown a further embodiment wherein the central thin-walled metal conductor 24 is a reentrant or U-shaped tube so as to provide a through path for the flow of cooling water therethrough. In this embodiment, the tuning of the cavity is effected by adjusting the electrostatic capacity between the central cavity conductor 24 and the bottom 25 in any suitable way. For example, a variable condenser 26 may be connected between the conductor 24 and the bottom of the cavity 25. Some mechanical means as indicated diagrammatically at 27 may be used to perform this adjustment. In Fig. 5, the highly resonant coaxial transmission line 28 has its central conductor 29 connected to cavity member 24, and the outer pipe or sheath 30 is connected to the outer member or casing 31 of the cavity.

Various changes and modifications may be made in the disclosed embodiments without departing from the spirit and scope of the invention as defined in the objects thereof and in the accompanying claim.

What is claimed is:

A power dissipating device for high frequency transmission systems comprising means defining a high frequency resonant cavity provided with one or more walls of metal having pronounced loss characteristics at high frequencies, means for tuning said cavity to resonance, a transmission line having a given surge impedance, and means including an inductive loop coupling said transmission line to a point in said cavity having an impedance characteristic corresponding substantially to the surge impedance of said line.

ARMIG G. KANDOIAN.

REFERENCES CITED

The following references are of record in the file of this patent:

UNITED STATES PATENTS

| Number | Name | Date |
|---|---|---|
| 2,124,029 | Conklin et al. | July 19, 1938 |
| 2,160,655 | Hansell | May 30, 1939 |
| 2,175,710 | Usselman et al. | Oct. 10, 1939 |
| 2,222,644 | Zottu | Nov. 26, 1940 |
| 2,235,521 | Higgins | Mar. 18, 1941 |
| 2,236,004 | MacLean | Mar. 25, 1941 |
| 2,262,134 | Brown | Nov. 11, 1941 |
| 2,389,167 | Smyth | Nov. 20, 1945 |
| 2,399,930 | Keister | May 7, 1946 |
| 2,400,976 | Cassen | May 28, 1946 |
| 2,402,663 | Ohl | June 25, 1946 |